BEST AVAILABLE COPY

United States Patent Office

Re. 27,096
Reissued Mar. 23, 1971

27,096
DETERGENT COMPOSITION

Arthur Polden Walker, Whitley Bay, England, assignor to The Procter & Gamble Company, Cincinnati, Ohio No Drawing. Original No. 3,332,876, dated July 25, 1967, Ser. No. 561,374, June 29, 1966, which is a continuation of Ser. No. 423,298, Jan. 4, 1965. Application for reissue Nov. 15, 1968, Ser. No. 808,709
Claims priority, application Great Britain, Oct. 15, 1966, 42,112
Int. Cl. C11d *1/12, 1/18*
U.S. Cl. 252—152 10 Claims

Matter enclosed in heavy brackets [ ] appears in the original patent but forms no part of this reissue specification; matter printed in italics indicates the additions made by reissue.

*ABSTRACT OF THE DISCLOSURE*

*A detergent composition having outstanding sudsing and detergent properties. The composition is a synergistic ternary mixture of olefin sulfonates, alkyl, benzene sulfonates and alkyl ether sulfates.*

This application is a continuation of Ser. No. 423,298, filed Jan. 4, 1965, by Arthur Polden Walker, entitled, Detergent Composition.

This invention relates to detergent compositions having outstanding sudsing and detergent properties, based on synergistic ternary mixtures of olefin sulfonates, alkyl benzene sulfonates and alkyl ether sulfates.

Mixtures of alkyl benzene sulfonates and alkyl ethylene glycol or polyethylene glycol ether sulfates have previously been used in combination detergent compositions and have synergistic properties. Thus the detergent power and sudsing power of mixtures of these detergents are greater than would be expected from consideration of their performance when used alone.

It is also known that olefins having a free hydrogen atom on a carbon in the alpha-position can be sulfonated directly using vigorous sulfonating agents. The sulfo radical attaches to the terminal carbon atom and the double bond remains intact, but may migrate from the alpha position. When the olefins have suitable molecular weight, the sulfonates have detergent properties.

It has now been found that ternary mixtures of olefin sulfonates, alkyl aryl sulfonates and alkyl ether sulfates are synergistic, and have sudsing and cleaning power better than would be expected from a knowledge of their performance when used alone, and, in particular, better than would be expected from a knowledge of the performance of binary mixtures, especially mixtures of alkyl benzene sulfonates and alkyl ether sulfates. without the third component, and of the third component alone.

According to the invention therefore there is provided a detergent composition comprising a synergistic ternary mixture of (A) an olefin sulfonate having 12 to 16 carbon atoms in the molecule, (B) an alkyl benzene sulfonate having an alkyl chain containing 10 to 18 carbon atoms and (C) an alkyl ether sulfate having the formula $RO(C_2H_4O)_xSO_3M$ wherein R is an alkyl chain having 10 to 18 carbon atoms, x is 1 to 5, and M is a cation.

The term "olefin sulfonates" is used herein to mean compounds which can be produced by the sulfonation of alpha olefins by means of uncomplexed sulfur trioxide, followed by neutralization of the acid reaction mixture in conditions such that any sultones which have been formed in the reaction are hydrolysed to give the corresponding hydroxy-alkane sulfonates. The sulfur trioxide may be liquid or gaseous, and is usually, but not necessarily, diluted by inert diluents, for example by liquid $SO_2$, chlorinated hydrocarbon, etc., when used in the liquid form, or by air, nitrogen, gaseous $SO_2$, etc., when used in the gaseous form. Complexes such as $SO_3$-dioxane, are not to be used.

The alpha olefins from which the olefin sulfonates are derived are mono-olefins having 12 to 16 carbon atoms, preferably 12 to 14 carbon atoms. Preferably, they are straight chain olefins. Olefin sulfonates having more than 16 carbon atoms do not give the desired high lathering performance in the mixtures according to the invention; those with fewer than 12 carbon atoms having reduced detergent properties.

In addition to the true alkene sulfonates and a proportion of hydroxy-alkane sulfonates, the olefin sulfonates may contain minor amounts of other materials, arising from impurities in the original olefin stock and from side reactions during the sulfonation process.

A preferred embodiment of the present invention is the use herein of the olefin sulfonate compositions which are described completely in a patent application Ser. No. 516,139, filed Dec. 23, 1965, by Phillip F. Pflaumer and Adriaan Kessler and titled, Detergent Composition.

The alkyl aryl sulfonates are preferably alkyl benzene sulfonates, and the alkyl chain preferably has 12 to 16 carbon atoms. The alkyl chain may be derived, for example, from branched or straight chain olefins, such as tetra- or penta-propylene polymers or mixtures thereof, straight chain alpha-olefins obtained from petroleum cracking or by the polymerization of ethylene, or from halogenated paraffins. An alkyl chain which is a straight chain containing 12 carbon atoms is generally very suitable.

The alkyl ether sulfates canbe made by the condensation by known methods of ethylene oxides on to monohydric alcohols having 10 to 18 carbon atoms. Preferably, R has 12 to 14 carbon atoms. The alcohols may be derived from fats, e.g., coconut oil, or they may be synthetic. Lauryl alcohol and straight chain alcohols derived from coconut oil are preferred. Such alcohols are reacted with 1 to 5, and especially 3, molar proportions of ethylene oxide and the resulting mixture of molecular species, having, for example, an average of 3 moles of ethylene oxide per mole of alcohol, is sulfated and neutralized.

The cation in the case of all the detergent ingredients may be alkali metal, ammonium or a substituted ammonium radical, or (as further explained below) may be in part magnesium, or may be an alkaline earth metal. It may be a mixture of any two or more of these.

While the addition of even small amounts of the olefin sulfonates to any mixtures of the alkyl aryl sulfonates and the alkyl ether sulfates provides synergistic mixtures, preferred mixtures comprise 5 to 75% of the olefin sulfonate, by weight of the ternary mixture and 95 to 25% of a mixture comprising the alkyl aryl sulfonate and the alkyl ether sulfate in a ratio from 9:1 to 3:7 by weight. Especially good performance is given by ternary mixtures containing 5 to 50% of the olefin sulfonate, and 95 to 50% of a mixture of the alkyl aryl sulfonate and the alkyl ether sulfate in a ratio of from 8.5:1.5 to 1:1 by weight.

It is found that the synergistic properties of the ternary mixtures of the invention are most marked when the compositions are used in hard water. Accordingly, where they may be used in soft water, it is advantageous to include some of a source of water hardness in the composition. This may be done by including a source of magnesium ion in the composition, either by adding a soluble magnesium salt, such as the sulfate or chloride or by incorporating one of the detergent ingredients at least partly in the form of its magnesium salt.

The compositions may contain any of the other ingredients usual in detergent compositions such as alkaline builder salts, bleaches, optical brighteners, sequestering agents, soil suspending agents, colors, perfumes, bacteriocides and the like. Other organic detergents may be present in minor proportions provided that they do not impair the performance of the ternary mixture of the invention. In particular, lather stabilizers, while usually unnecessary, may be added; examples are fatty acyl ethanolamides, especially lauric monoanolamide.

The ternary mixtures are useful in solid, pasty or liquid detergent compositions, and are particularly well suited to liquid ones. In such liquid compositions they are dispersed or dissolved in a liquid medium, preferably water, optionally containing solubilizing agents such as lower monohydric alcohols having 1 to 4 carbon atoms, or hydrotropic salts such as toluene or xylene sulfonates, etc.

The following examples serve to illustrate the invention. In these examples, the lathering power of the detergent compositions was measured by the following test.

A frame was provided in which a number, for example six, 500 ml. cylinders could be placed and rotated about an axis perpendicular to their long axis. Into each cylinder was placed 100 ml. of a solution of the detergent composition in water at 115° F., the concentration being selected according to the information required from the test. To each solution was added 3 ml. of a standard soil load, namely, a liquid edible shortening based mainly on marine oils. The cylinders were then rotated in the frame for 1 minute at 20 r.p.m. They were then stood upright, the stoppers were removed, and the lather height above the clear liquid was measured. A further addition of 3 ml. of the soil was made and the procedure was repeated until substantially no lather remained.

The sum of the measured lather heights is reported as the "lather height."

Example I

Several different liquid detergent compositions were made, each containing a total of 40% by weight of active detergent consisting of olefin sulfonates derived from alpha-olefin having 14 carbon atoms, tetra-propylene alkyl benzene sulfonate, and coconut alkyl triethylene glycol ether sulfate, all in the form of their sodium salts. The proportions of these components in each composition are indicated in the table below. The remainder of each composition consisted primarily of water, containing sufficient solubilizing agent (lower alcohol and, if necessary, hydrotrope) to give a homogeneous composition. Each composition was dissolved in hard water (18°) to give a solution containing 0.26% of the composition, and tested for lather power by the method described above. The results are given in the following table:

| Serial | Composition | | | Lather height (inches) |
|---|---|---|---|---|
| | Olefin sulfonate | Alkyl benzene sulfonate | Alkyl ether sulfate | |
| a | 40 | 0 | 0 | 6.98 |
| b | 0 | 40 | 0 | 2.74 |
| c | 0 | 0 | 40 | 2.63 |
| d | 0 | 20 | 20 | 11.06 |
| e | 0 | 30 | 10 | 13.14 |
| f | 10 | 20 | 10 | 13.60 |
| g | 20 | 10 | 10 | 12.46 |

Compositions f and g were according to the invention, the others being included for comparison. Composition f had better lather power than the best binary mixtures e. Composition g had better lather power than would be expected of a 1:1 mixture of half the detergent ingredients of compositions a and d, which would have the same formula.

The compositions according to the invention had excellent detergent properties.

Example II

Liquid detergent compositions were made containing a total of 40% by weight of active detergent consisting of a biologically degradable alkyl benzene sulfonate having a substantially straight chain alkyl group averaging 12 carbon atoms, and the same olefin sulfonate and alkyl ether sulfate used in Example I. The remainder of each composition consisted primarily of water, containing sufficient solubilizing agent (lower alcohol and, if necessary, hydrotrope) to give a homogeneous composition. Each composition was tested as in Example I. The results are given in the following table;

| Serial | Composition | | | Lather height (inches) |
|---|---|---|---|---|
| | Olefin sulfonate | Alkyl benzene sulfonate | Alkyl ether sulfate | |
| a | 40 | 0 | 0 | 7.55 |
| b | 0 | 40 | 0 | 2.00 |
| c | 0 | 0 | 40 | 2.33 |
| d | 0 | 20 | 20 | 9.56 |
| e | 10 | 20 | 10 | 10.81 |
| f | 20 | 10 | 10 | 10.87 |

Compositions e and f were according to the invention, the others being included for comparison. Both e and f had better lather power than was provided by the best binary mixture of alkyl benzene sulfonate and alkyl ether sulfate, composition d. Moreover, composition f had better lather power than would be expected of a 1:1 mixture of half the detergent ingredients of compositions a and d which would have the same formula.

The compositions according to the invention had excellent detergent properties.

In the compositions of the present invention, the ternary mixture may be used in any desired proportion. If the proportion is very small, for example less than 10% by weight of the composition, then inconveniently large amounts of the composition may have to be transported and used in order to achieve a given amount of cleaning. If the proportion is very great, then there may not be sufficient place for all other desired ingredients of the composition (such as builder salts in the case of solid compositions) or, it may be difficult to achieve a stable composition (in the case of liquid compositions). Suitable proportions of the ternary mixture will often be found to be within the range from 10 to 60%, by weight of the composition. Proportions within the range from 20 to 50% are preferred for liquid compositions.

What is claimed is:

1. A detergent composition consisting essentially of a synergistic ternary mixture of (A) a straight chain mono-olefin sulfonate having 12 to 16 carbon atoms in the molecule, (B) an alkyl benzene sulfonate having an alkyl chain containing 10 to 18 carbon atoms and (C) an alkyl ether sulfate having the formula $RO(C_2H_4O)_xSO_3M$ wherein R is an alkyl chain of 10 to 18 carbon atoms, x is a value from 1 to about 5, the cation of said sulfonate compounds and the cation M of said sulfate compound being selected from the group consisting of alkali metal, ammonium, magnesium and alkaline earth metal, the proportion of said mono-olefin sulfonate being from about 5 to 75% of the ternary mixture and 95 to [65%] 25% of a mixture of said alkyl aryl sulfonate and said alkyl ether sulfate in a ratio of from 9:1 to 3:7 by weight.

2. A detergent composition according to claim 1 wherein said mono-olefin sulfonate has chain length of 12 to 14 carbon atoms.

3. A detergent composition according to claim 1 wherein the alkyl benzene sulfonate has an alkyl chain of 12 to 16 carbon atoms.

4. A detergent composition according to claim 3 wherein the alkyl group of the alkyl benzene sulfonate is derived from the group consisting of tetrapropylene, pentapropylene, and mixtures thereof.

5. A detergent composition according to claim 3 wherein the alkyl group of the alkyl benzene sulfonate is a straight chain having 12 carbon atoms.

6. A detergent composition according to claim 1 wherein the alkyl ether sulfate has an alkyl chain of 12 to 14 carbon atoms and is derived from coconut alcohols.

7. A detergent composition according to claim 6 wherein the alkyl ether sulfate has the formula $$RO(CH_2CH_2O)_3H$$

where R represents an alkyl group having 12 to 14 carbon atoms.

8. A detergent composition according to claim 1 wherein the proportion of said mono-olefin sulfonate is from 5 to 50% of the ternary mixture and the ratio of said alkyl benzene sulfonate to said alkyl ether sulfate is from 8.5:1.5 to 1:1.

9. A detergent composition according to claim 1 which also contains a water soluble magnesium salt selected from the group consisting of magnesium sulfate and magnesium chloride.

10. A liquid detergent composition consisting essentially of from 10% to 60% of the composition of claim 1 and the balance being water.

References Cited

The following references, cited by the Examiner, are of record in the patented file of this patent or the original patent.

UNITED STATES PATENTS

| | | | |
|---|---|---|---|
| 2,061,617 | 11/1936 | Downing et al. | 260—513 |
| 2,086,215 | 7/1937 | DeGroote | 252—338 |
| 2,846,402 | 8/1958 | Lew | 252—152 |
| 2,972,583 | 2/1961 | Hewitt | 252—161 |

FOREIGN PATENTS

| | | |
|---|---|---|
| 704,288 | 2/1954 | Great Britain. |

OTHER REFERENCES

Chem. Ber., 97, #10, 2903–13 (October 1964); Higher Molecular Aliphatic Sulfonic Acids. I. 2-hydroxy-1-n-Alkanesulfonic Acids, F. Puschel and Claus Kaiser.

Chem. Ber. 97, #10, 2917–25 (October 1964); Higher Molecular Aliphatic Sulfonic Acids. II. 3-hydroxy-1-n-Alkanesulfonic Acids and Their Inner Esters (1,3-sultones). F. Puschel and Claus Kaiser.

Chem. Ber. 97, #10, 2926–33 (October 1964); Higher Molecular Unsaturated Sulfonic Acids and the Hydrolysis of 1,3-alkanesultones. F. Puschel and Claus Kaiser.

Chem. Ber. 98, 735–742 (1965); Higher Molecular Aliphatic Sulfonic Acids. IV. Sulfonation of Unbranched Alpha-Olefins With $SO_3$, F. Pusched and Claus Kaiser.

Stupel: Manufacturing Chemist, "Combination of Raw Materials Improves Synthetic Detergents," March 1952, pp. 99–102.

MAYER WEINBLATT, Primary Examiner

U.S. Cl. X.R.

252—137, 138, 161